Aug. 5, 1941.　　　J. H. ONIONS　　　2,251,714
ROLLER BEARING, PARTICULARLY FOR AIRCRAFT SHOCK ABSORBERS
Filed May 20, 1940　　　3 Sheets-Sheet 1
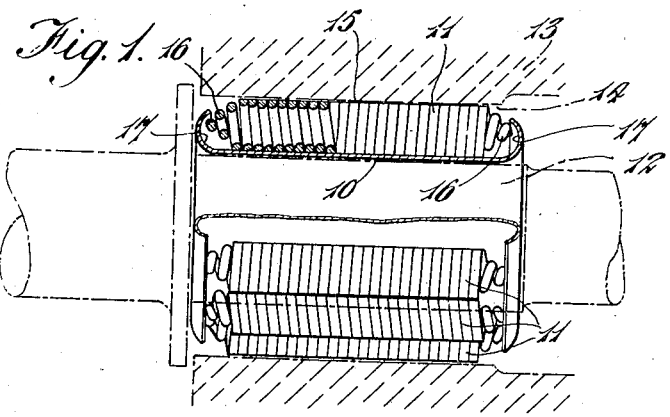
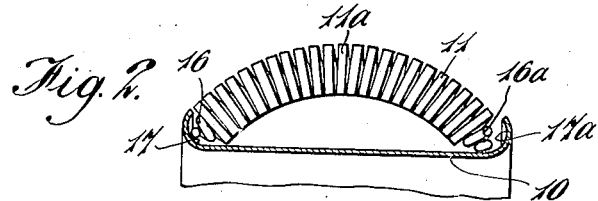
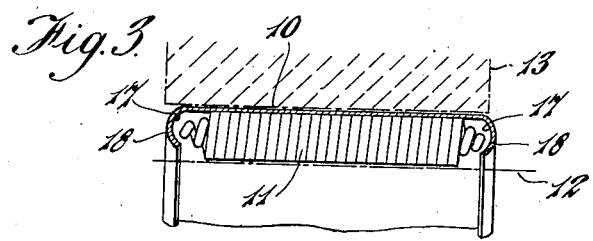
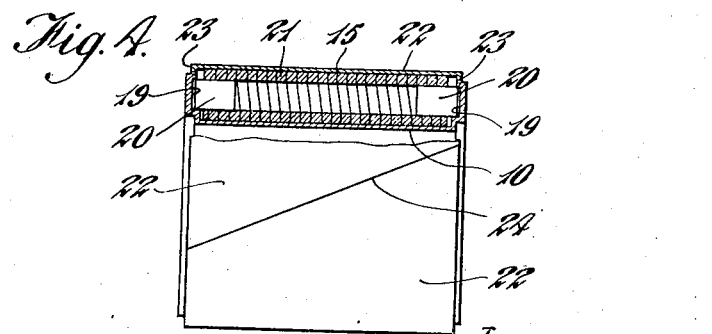
INVENTOR
John H. Onions
By: Stevens and Davis
ATTYS.

Aug. 5, 1941.   J. H. ONIONS   2,251,714
ROLLER BEARING, PARTICULARLY FOR AIRCRAFT SHOCK ABSORBERS
Filed May 20, 1940   3 Sheets-Sheet 2
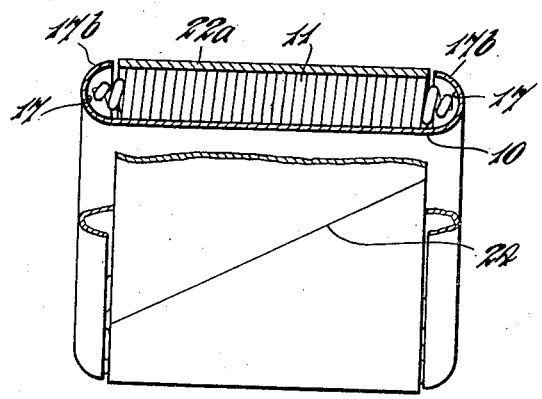
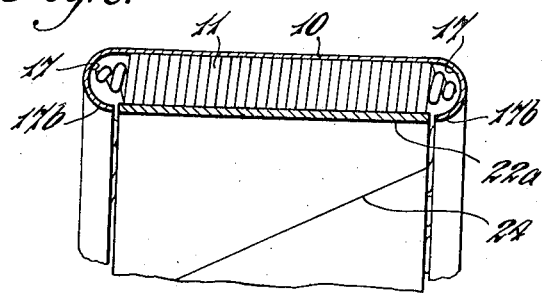
INVENTOR
John H. Onions
By: Stevens and Davis
ATTYS.

Aug. 5, 1941.　　　J. H. ONIONS　　　2,251,714
ROLLER BEARING, PARTICULARLY FOR AIRCRAFT SHOCK ABSORBERS
Filed May 20, 1940　　　3 Sheets-Sheet 3
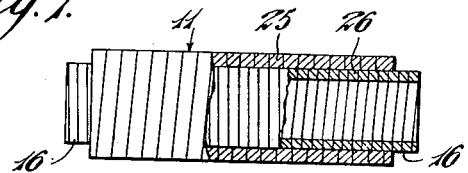
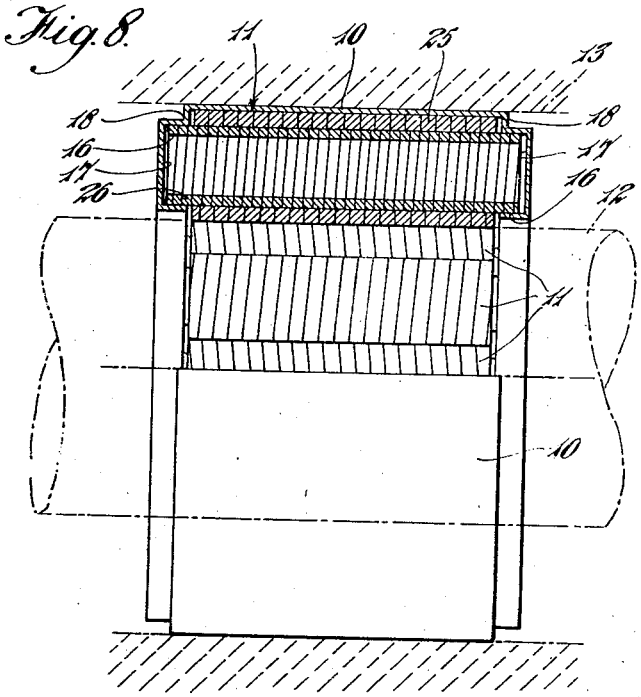
INVENTOR
John H. Onions
By: Stevens and Davis
ATTYS.

Patented Aug. 5, 1941

2,251,714

UNITED STATES PATENT OFFICE 2,251,714

ROLLER BEARING, PARTICULARLY FOR AIRCRAFT SHOCK ABSORBERS

John Henry Onions, London, England

Application May 20, 1940, Serial No. 336,294
In Great Britain June 21, 1939

11 Claims. (Cl. 308—215)

This invention relates to roller bearings, particularly for aircraft shock absorbers.

It is the primary object of the present invention to provide a simple and light form of roller journal bearing which is easy and cheap to manufacture and is efficient in service.

According to the invention a roller journal bearing comprises in combination a tubular member forming one race, a plurality of rollers composed of helically wound wire coils, and means upon said tubular member for engaging and retaining the ends of the rollers to hold said rollers in position against the surface of the tubular member. The other race can conveniently be constituted by the surface of one of the members between which the roller bearing is required to operate.

According to a further feature of the invention a roller journal bearing is provided comprising an inner tubular race, an outer tubular race, and a plurality of rollers composed of helically wound coils, one of said races being formed at each end with a radial flange having an axially directed annular groove within which the ends of the rollers engage and by which they are retained so that the rollers form a unit with the said one race. Preferably the end parts of the rollers are of reduced diameter to engage with the retaining means upon said one race, both ends of each roller conveniently being of frusto-conical shape to engage with the retaining means of the said one race. These frusto-conical parts can conveniently be produced by successively reducing the diameter of those convolutions disposed at the ends of said roller. Alternatively there may be provided at each end of each roller a portion of reduced diameter comprising a pin or equivalent, such as a short length of tube, inserted into the end convolutions of the roller.

If desired each of the rollers may comprise a plurality of wire helices disposed one inside another and arranged to cooperate in resisting compression of the roller in a diametral sense, the outer layer conveniently having a shorter axial length than one or more of the inner layers so that the latter project at each end to form the parts of reduced diameter. Adjacent superimposed layers may be wound in opposite directions, and all the layers of each roller can be composed of wire having a rectangular cross section. With this arrangement increased resilience is obtained and the rollers are capable of being compressed diametrally to a relatively large amount without over-stressing the material. The distortion of the rollers to an oval shape in cross section considerably increases the area of contact between the rollers and the races, thus reducing the likelihood of indentation occurring.

In order to avoid grooving the races as the roller bearing wears, and also with a view to avoiding endwise displacement of the parts due to the "screwing" action of the helically coiled rollers, the latter are preferably arranged so that some are wound in one direction (e. g. clockwise), the remainder being wound in the opposite direction (e. g. anti-clockwise), alternate rollers conveniently being composed of clockwise helices, while the intervening rollers are composed of anti-clockwise helices.

The above-mentioned one race may be composed of thin metal tube, the end parts of which are turned back by spinning, pressing or the like to produce a pair of annular grooves for retaining the ends of the rollers in a manner which is already known for bearings having rollers of the solid variety. Thus one race may be formed with the retaining means, while the other race has a pair of inwardly directed flanges whereby it is retained axially in relation to the rollers and the inner race, or is in the form of a plain tube which is located against axial displacement by its ends engaging with the edges of the retaining flanges of the said one race. The said other race may be split so that it can be enlarged or reduced in diameter to permit assembly, the split preferably being arranged obliquely with respect to the axes of the adjacent rollers in order to enable the rollers to pass smoothly from one side of the split to the other.

The invention is illustrated by way of example in the accompanying diagrammatic drawings, in which:

Figure 1 is a side elevation of an improved roller bearing shown partly in section, the members between which the bearing operates being indicated in broken lines;

Figure 2 is a fragmentary radial section taken through the bearing to illustrate the method by which the rollers are assembled and removed;

Figure 3 is a fragmentary radial section showing the roller bearing arranged with the race upon the outside;

Figure 4 is a side elevation, partly in section, showing a modified arrangement incorporating inner and outer races;

Figure 5 is a part sectional side elevation of a modified construction;

Figure 6 is a fragmentary sectional view of a still further modification;

Figure 7 is an elevation of a modified construction of roller shown partly in section; and Figure 8 is a part sectional side elevation of a bearing incorporating rollers of the form shown in Figure 7.

The roller bearing shown in Figure 1 comprises a tubular member 10 which serves as the inner race for a circumferential series of rollers 11. The tubular member 10 fits snugly upon an inner member such as a shaft or stub axle indicated in broken lines at 12, while the rollers 11 are arranged to engage directly with an outer member 13 having an internal cylindrical surface 14 adapted to act as an outer race. The rollers 11 are composed of helical coils of stiff wire such as hard steel, these being closely wound so that the adjacent turns bear against one another. The exterior of each roller is ground to form a substantially continuous cylindrical surface 15 which extends for the major part of the length of the roller, the grinding of course preferably being done after any hardening and tempering operations have been carried out. At its two ends each of the rollers is progressively reduced in diameter to form frusto-conical portions 16, this conveniently being effected by progressively reducing the diameter of the end convolutions during the winding of the wire, as will be clear from Figure 1. These end parts 16 are adapted to engage within annular grooves or recesses 17 produced at the two ends of the tubular inner race 10 conveniently by a pressing, spinning or like operation. In the form of bearing shown in Figure 1 the rollers 11 are arranged contiguously side by side and it will be noted that adjacent rollers have their convolutions wound in opposite senses, the first being, say, clockwise, the next anticlockwise, the next clockwise, and so on. This, as above mentioned, avoids the formation of grooves in the surface 14 of the member 13 and also in the external surface of the tubular member 10. Moreover, should slipping occur between the rollers and the races the helical formation of said rollers might possibly cause axial forces to be produced, tending to displace the parts of the roller bearing relatively in an axial direction, but any such tendency is avoided by arranging the rollers 11 so that half of them are wound clockwise and the other half anticlockwise.

The method of assembling the rollers is shown clearly in Figure 2, from which it will be seen that the flexible nature of said rollers enables each of the latter to be shortened in length by deflecting it in the form of a hump indicated at 11a. One end 16 is, of course, previously inserted into the corresponding recess of the tubular member 10, and the deflection at 11a enables the opposite end of the roller 11 to be readily inserted into its corresponding recess as indicated at 16a and 17a. If desired, of course, spacing means (not shown) in the nature of a cage may be provided to separate the rollers 11, and such a cage might conveniently be adapted also to engage with the recesses 17 in the ends of the tubular member 10.

It will of course be appreciated that the tubular member 10 would normally be constructed from hardened or case-hardened steel, or from metal having good wearing properties, and that similarly the surface 14 of the outer member 13 should also be capable of withstanding the action of the rollers 11 for a reasonable length of time. The wear-resisting properties of the material of which the shaft or equivalent 12 is composed is of relatively little importance, as it is protected from the action of the rollers 11 by the tubular member 10.

In cases where the shaft or equivalent 12 is quite capable of acting as the inner race, the arrangement shown in Figure 3 may be adopted. Only one roller 11 is shown and this is the same in construction as those previously described, but the tubular member 10 is adapted to act as the outer race and has its end parts turned inwardly as indicated at 18 to form the recesses 17 for receiving the reduced end portions of the rollers 11. These rollers extend side by side for the complete circumference of the member 12, with the outer surface of which latter they engage directly. The tubular member 10 in this example would, of course, be a tight fit within the outer of the movable members indicated at 13.

If desired the improved journal bearing can be arranged to be complete with inner and outer races and one such construction is shown in Figure 4. The tubular member is again indicated at 10 and it has its end parts flanged outwardly and shaped to provide a pair of annular grooves 19 which face one another and are of substantially rectangular cross-section. These are adapted to engage with pins 20 which are securely fastened within the end convolutions of the corresponding roller 11, the latter in this example being composed of square or rectangular section wire as indicated at 21 so as to have increased strength. The outer surface 15 of each roller is again ground to provide a substantially continuous and smooth cylindrical working surface. The outer race is constituted by a member 22 which is also tubular in form and is provided around its two ends with small inwardly directed flanges 23 which are adapted to engage with the end convolutions of the roller 11 and thus retain the outer race 22 against displacement in an axial direction. In order to facilitate the assembly and taking apart of the bearing the outer race 22 is split diagonally as indicated at 24, the arrangement being such that the edges of the split are in close engagement when the internal surface of the outer race has its proper working diameter. The split 24 is arranged obliquely with respect to the axes of the adjacent rollers in order that said rollers may pass smoothly from one side of the split to the other. Obviously this arrangement may be reversed when desirable, the inner race being split, while the outer race is formed with the annular grooves to retain the rollers.

A modified form of bearing, constructed similarly to that in Figure 1 is shown in Figure 5, but in this instance a race 22a disposed on the outside of the bearing is in the form of a plain tube the ends of which are arranged to abut the edges 17b of the tubular member 10. The race 22a is obliquely split at 24 in order that it may be sprung over one of the edges 17b during assembly. The opposite arrangement is shown in Figure 6, where the tubular member 10 constitutes the outer race, while the plain, obliquely split race 22a is disposed inside, and is located axially by the edges 17b of the tubular member 10. The bearings shown in Figures 4, 5 and 6 are totally enclosed and can advantageously be packed with grease during assembly, while dirt is efficiently excluded when the bearing is in service.

The modified construction of roller 11 shown in Figure 7, comprises an outer, closely wound helix 25 composed of wire having a rectangular cross section. Within this outer layer, an inner layer 26 is disposed, this also being helically wound but in the opposite direction to the first layer 25, and also being composed of rectangular section wire. The layer 26 is, however, longer than the layer 25 and is arranged to project beyond the latter at each end to form spigot portions 16 of reduced diameter. It will be appreciated that a roller constructed according to the invention with two or more separate layers is more resilient and is less liable to fatigue than is a roller consisting of a single wire coil of the same total thickness.

The journal bearing illustrated in Figure 8 comprises an outer tubular member 10, the internal surface of which is arranged to act as the outer race of the bearing. The two ends of the member 10 are flanged radially inwards at 18 and each is shaped to form an annular groove or recess 17 of substantially rectangular cross-section adapted to receive the spigots 16 of the various rollers 11. The outer surfaces of the rollers 11 which are preferably ground so as to be truly cylindrical and substantially continuous are thus adapted to roll upon the internal surface of the tubular member 10, which may, if desired, be hardened so as to have good wearing properties. The tubular member 10 is itself secured firmly within a member 13 which is required to move relative to an inner member, the surface of which is indicated at 12. The rollers 11 have their outer layers 25 wound in different directions, and as will be seen in Figure 8, said rollers are arranged alternately with a view to avoiding the formation of grooves in the surface 12 and the interior of the tubular member 10 as wear takes place. This method of assembly also avoids any tendency for the parts 12 and 13 to move axially in one direction or the other on account of the "screwing" action of the rollers in the event of any slipping taking place.

The use in journal bearings of rollers having the improved resilient construction has been found to give good results in practice, more particularly in aircraft work where lightness is of considerable importance. The resilient nature of the rollers enables relatively high loads to be taken, more especially where vibration occurs simultaneously as the rollers tend to assume an oval shape, thus enlarging their area of contact with the races and so avoiding indentation of the latter.

The invention is particularly suitable for use in the elbow joints of the V-linkages used to prevent rotation of shock absorber legs, but of course it is applicable wherever a relatively light roller bearing is required for reducing the friction in a journal bearing, and it is not intended to limit its use to aircraft. The improved bearings can if desired be arranged with resilient rollers of tapered shape.

What I claim is:

1. A roller journal bearing as claimed in claim 10, wherein there is provided at each end of each roller, a portion of reduced diameter comprising a pin inserted into the end convolutions of the roller.

2. A roller journal bearing comprising an inner tubular race, an outer tubular race, and a plurality of rollers composed of helically wound coils, one of said races being formed at each end with a radial flange having an axially directed annular groove within which the ends of the rollers engage and by which they are retained so that the rollers form a unit with the said one race, each of the rollers comprising a plurality of wire helices disposed one inside another and arranged to cooperate in resisting compression of the roller in a diametral sense.

3. A roller journal bearing as claimed in claim 2, wherein the outer layer has a shorter axial length than one or more of the inner layers so that the latter project at each end to form the parts of reduced diameter.

4. A roller journal bearing comprising an inner tubular race, an outer tubular race, and a plurality of rollers composed of helically wound coils, one of said races being formed at each end with a radial flange having an axially directed annular groove within which the ends of the rollers engage and by which they are retained so that the rollers form a unit with the said one race, the one race being composed of thin metal tube, the end parts of which are turned back by spinning, pressing or the like to produce a pair of annular grooves for retaining the ends of the rollers.

5. A roller journal bearing as claimed in claim 10, wherein one race is formed with the retaining means, and the other race has a pair of inwardly directed flanges whereby it is located axially in relation to the rollers and the said one race.

6. A roller journal bearing as claimed in claim 10, wherein one of the races is formed with the roller retaining means, and the other race comprises a plain tube which is located against axial displacement by its ends engaging with the edges of the radial flanges of the said one race.

7. A roller journal bearing as claimed in claim 10, wherein one of the races is formed with the roller retaining means, and the other race comprises a plain tube which is located against axial displacement by its ends engaging with the edges of the radial flanges of the said one race, the said other race being split so that it can be enlarged in diameter to permit the assembling of the bearing.

8. A roller journal bearing as claimed in claim 10, wherein one of the races is formed with the roller retaining means, and the other race comprises a plain tube which is located against axial displacement by its ends engaging with the edges of the radial flanges of the said one race, the said other race being split obliquely with respect to the axes of the adjacent rollers.

9. A roller bearing comprising a tubular member acting as one race, an integral flange formed at each end of said tubular member, said flanges having their mutually facing faces grooved to produce in each case a continuous lip directed towards the other flange, and a circumferential series of rollers, each of which is constituted by a helical wire coil so that said rollers can be assembled with their ends disposed within the grooves in the flanges of the tubular member, those rollers which are last inserted being bent to shorten their effective length so that their ends may be passed between the lips of the flanges.

10. A roller bearing comprising a tubular member acting as one race, an integral flange formed at each end of said tubular member, said flanges having their mutually facing faces grooved to produce in each case a continuous lip directed towards the other flange, which flanges and lips are of uniform cross-section throughout their length, and a circumferential series of rollers, each of which is constituted by a helical wire coil so that said rollers can be assembled with their ends disposed within the grooves in the flanges of the tubular member, those rollers which are last inserted being bent to shorten their effective length so that their ends may be passed between the lips of the flanges.

11. A roller bearing comprising a tubular member acting as one race, an integral flange formed at each end of said tubular member, said flanges having their mutually facing faces grooved to produce in each case a continuous lip directed towards the other flange, which flanges and lips are of uniform cross-section throughout their length, and being composed of material having a thickness substantially equal to that of the tubular part of the race, and a circumferential series of rollers, each of which is constituted by a helical wire coil so that said rollers can be assembled with their ends disposed within the grooves in the flanges of the tubular member, those rollers which are last inserted being bent to shorten their effective length so that their ends may be passed between the lips of the flanges.

JOHN HENRY ONIONS.